United States Patent [19]

Yusa et al.

[11] 4,337,324
[45] Jun. 29, 1982

[54] VINYL CHLORIDE RESIN COMPOSITION

[75] Inventors: Haruhiko Yusa; Yo Iizuka; Humio Akutsu, all of Iwaki, Japan

[73] Assignee: Kureha Kagaku Kogyo Kabushiki Kaisha, Tokyo, Japan

[21] Appl. No.: 226,471

[22] Filed: Jan. 19, 1981

[30] Foreign Application Priority Data

Jan. 25, 1980 [JP] Japan .................................. 55-7629

[51] Int. Cl.³ .............................................. C08L 51/00
[52] U.S. Cl. ........................................ 525/72; 525/75; 525/78; 525/80; 525/81; 525/82; 525/83; 525/85; 525/86; 525/239; 525/240
[58] Field of Search ....................... 525/72, 75, 78, 80, 525/81, 82, 83, 85, 86

[56] References Cited

U.S. PATENT DOCUMENTS 4,220,734  9/1980  Kosugi et al. ......................... 525/85

*Primary Examiner*—J. Ziegler
*Attorney, Agent, or Firm*—Wenderoth, Lind & Ponack

[57] ABSTRACT

A monomer mixture comprising α-methylstyrene or 2-isopropenylnaphthalene, methyl methacrylate, and acrylonitrile is polymerized in the presence of a crosslinked polymer obtained by copolymerizing a monofunctional monomer such as α-methylstyrene with a small quantity of a polyfunctional monomer such as divinylbenzene to obtain a copolymer (C). A vinyl chloride resin composition formulated by blending the copolymer (C) thus obtained with a vinyl chloride resin and an impact strength modifier resin in a specific proportion possesses improved thermal deformation resistance and impact strength while retaining processability comparable to that of the vinyl chloride resin mixed with the impact strength modifier resin.

7 Claims, No Drawings

VINYL CHLORIDE RESIN COMPOSITION

BACKGROUND OF THE INVENTION

The present invention relates to a vinyl chloride resin composition with improved thermal deformation resistance, impact strength and processability.

As is well known, formed products of vinyl chloride resins exhibit practical thermal deformation resistance at temperatures up to about 70° C. but are not suitable for use at temperatures thereabove. Accordingly, there have been various attempts to raise the thermal deformation temperature of the formed vinyl chloride resin products as disclosed in Japanese Patent Publn. No. 24867/1970 and No. 18101/1973, but the resin compositions disclosed therein do not have satisfactory processability.

More particularly, in order to improve the thermal deformation resistance of vinyl chloride resins including those also comprising an impact strength modifier, Japanese Patent Publn. No. 24867/1970 proposes adding to a vinyl chloride resin a styrene/acrylonitrile/methyl methacrylate/α-methylstyrene copolymer, and Japanese Patent Publn. No. 18101/1973 discloses the addition thereto of an α-methylstyrene/methyl methacrylate/acrylonitrile copolymer. However, in order to obtain highly satisfactory thermal deformation resistance, it is necessary to add either of the copolymers in a quantity of not less than 10% (by weight, as in all percentages and parts set forth hereinafter), preferably not less than 20%. For this reason, the processability of these resin compositions is widely different from that of a composition consisting of a vinyl chloride resin and an impact strength modifier resin. (Since vinyl chloride resins, in general, have no satisfactory impact strength, it is conventional to add an impact strength modifier when these resins are used for purposes where impact strength is required, and impact strength modifiers are also utilized in the aforementioned two inventions.)

As will be apparent from the specific data in the examples set forth hereinafter, the compositions of the two inventions described above have larger die swells, especially when these compositions are subjected to extrusion molding, than the vinyl chloride/impact strength modifier resin composition. The two prior art compositions of the above cited publications have processabilities differing greatly from those of conventional vinyl chloride resin compositions and therefore cannot be practically used for the profile extrusion or pipe extrusion for which strict dimensional accuracy is required.

SUMMARY OF THE INVENTION

A principal object of the present invention is to provide a vinyl chloride resin composition having improved thermal deformation resistance and impact strength while retaining processability comparable to that of a vinyl chloride resin mixed with an impact strength modifier resin.

The vinyl chloride resin composition of this invention with improved thermal deformation resistance, impact strength and processability comprises: (A) a vinyl chloride resin; (B) an impact strength modifier resin; and (C) a copolymer, in which the vinyl chloride resin (A) constitutes 20 to 80% of the composition, the total of the impact strength modifier resin (B) and the copolymer (C) constitutes 80 to 20% of the composition, and the copolymer (C) constitutes 90 to 20% of the total of the impact strength modifier resin (B) and the copolymer (C), said copolymer (C) having been obtained by polymerizing 90 to 30 parts of a monomer mixture comprising 20 to 80% of a monomer selected from the group consisting of α-methylstyrene and 2-isopropenylnaphthalene, 1 to 70% of methyl methacrylate, 5 to 30% of acrylonitrile, and 0 to 30% of a monomer copolyermizable with the preceding monomers in the presence of a crosslinked polymer obtained by copolymerizing 10 to 70 parts of a monofunctional monomer selected from the group consisting of methyl methacrylate, acrylonitrile, methacrylonitrile, styrene, α-methyl-styrene, 2-isopropenylnaphthalene, and mixtures thereof with 0.01 to 7 parts of a polyfunctional monomer having a plurality of non-conjugated ethylenic unsaturations, the sum of the quantities of said monofunctional monomer and said monomer mixture being 100 parts, all quantities expressed in percent and parts being by weight.

The nature, utility, and further features of the present invention will be more clearly understood from the following detailed description.

DETAILED DESCRIPTION OF THE INVENTION

The impact strength modifier resin (B) used in the present invention may be any resin capable of imparting high impact strength to vinyl chloride resins, and thus may be a resin commonly used in the art. For example, copolymers of elasticity imparting monomers such as diolefins and alkyl acrylates and rigidity imparting monomers such as alkyl methacrylates, styrene, α-methylstyrene, acrylonitrile, and methacrylonitrile can be used. Examples of such copolymers are crosslinked or non-crosslinked copolymers predominantly comprising methyl methacrylate, butadiene and styrene, crosslinked or non-crosslinked copolymers predominantly comprising acrylonitrile, butadiene and styrene, and copolymers predominantly comprising methyl methacrylate, alkyl acrylates and styrene. Substituted polyethylenes such as chlorinated polyethylenes and chlorosulfonated polyethylenes can also be employed. These impact strength modifier resins (B) can be used either singly or in mixture.

The copolymer (C) is obtained by polymerizing 90 to 30 parts of a monomer mixture comprising 20 to 80% of α-methylstyrene or 2-isopropenylnaphthalene, 1 to 70% of methyl methacrylate, 5 to 30% of acrylonitrile, and 0 to 30% of a monomer copolymerizable therewith in the presence of 10.01 to 77 parts of a crosslinked polymer.

In the preparation of the copolymer (C) in the resin composition of the present invention, it is essential that a monomer mixture comprising α-methylstyrene or 2-isopropenylnaphthalene, methyl methacrylate, acrylonitrile, and, if desired, a monomer copolymerizable therewith be polymerized in the presence of a crosslinked polymer. A method wherein the polymerization is carried out in the reverse order, or a method wherein the crosslinked polymer and a copolymer of the above listed monomers are prepared separately and then mixed with each other is undesirable because the impact strength of the resulting composition becomes poor.

The term "polymerization of monomers in the presence of a crosslinked polymer" is herein used in a broader sense than "graft polymerization", and all of the monomers in the monomer mixture comprising α-methylstyrene or 2-isopropenylnaphthalene, methyl methacrylate, acrylonitrile, and a monomer copolymerizable therewith need not be grafted on the crosslinked polymer, but part of the monomers may be polymerized in ungrafted state to produce a polymer blend.

Alpha-methylstyrene or 2-isopropenylnaphthalene effectively improves the thermal deformation resistance of the composition of the present invention, but less than 20% of this group of monomers is ineffective while the use of this group of monomers in excess of 80% results in inadequate toughness of the resulting composition and also makes it difficult to employ an ordinary radical polymerization process.

Acrylonitrile imparts to the copolymer (C) compatibility with the vinyl chloride resin, and is added in a quantity of 5 to 30%. The addition of less than 5% of the acrylonitrile is meaningless, while more than 30% of this monomer causes undesirable coloring and lowers the thermal deformation resistance of the desired composition.

Methyl methacrylate is essential in order to improve the compatibility between the copolymer and the vinyl chloride resin as well as to obtain better polymerizability and is used in a quantity of 1 to 70%. The addition of less than 1% of the methyl methacrylate is ineffective while the use of this monomer in excess of 70% is undesirable because the thermal deformation resistance of the desired composition becomes poor.

Together with these three types of monomers, one or more monomers copolymerizable therewith may be added. Examples of such monomers are aromatic vinyl compounds other than α-methylstyrene, such as styrene and vinyl toluene, methacrylonitrile, vinyl acetate, methacrylic acid, acrylic acid, maleic acid, fumaric acid, itaconic acid, and esters thereof, and these monomers can be used in a quantity of 0 to 30%.

Of course, chain transfer agents, typically mercaptan, can also be added in order to control the degree of polymerization.

The crosslinked polymer or the first-stage crosslinked polymer is required to have a softening temperature higher than that of the vinyl chloride resin.

This crosslinked polymer is obtained by copolymerizing 10 to 70 parts of a monofunctional monomer selected from the group consisting of methyl methacrylate, acrylonitrile, methacrylonitrile, styrene, α-methylstyrene, 2-isopropenylnaphthalene, and mixtures thereof with 0.01 to 7 parts of a polyfunctional monomer having a plurality of non-conjugated ethylenic unsaturations. Among the monofunctional monomers enumerated above, particularly α-methylstyrene and 2-isopropenylnaphthalene effectively raise the softening temperature of the crosslinked polymer.

Although the crosslinked polymer can be prepared by an ordinary polymerization process, emulsion polymerization is particularly preferred since polymers of a high degree of polymerization are readily obtained.

The first-stage crosslinked polymer is required in order to improve the processability of the resin composition of the present invention, especially to maintain the die swell thereof in extrusion molding lower than that of conventional vinyl chloride resin/impact strength modifier resin compositions. If the quantity of this polymer is less than 10.01 parts, the effect of lowering the die swell of the resin composition will be poor. Conversely, in case more than 77 parts of this polymer is used, the impact strength of the resulting resin composition will be lowered.

The polyfunctional monomer is used to impart an effective crosslinking structure to the crosslinked polymer without impairing the impact strength thereof and is added in a quantity of 0.01 to 7 parts.

For this purpose, a polyfunctional monomer having "a plurality of non-conjugated ethylenic unsaturations" is used. The term "a plurality of non-conjugated ethylenic unsaturations" as used herein means that the plurality of ethylenic unsaturations are mutually non-conjugated. The polyfunctional monomer used in the present invention does not include conjugated dienes such as butadiene and isoprene which do not practically function as crosslinking agents.

Examples of the polyfunctional monomers are divinylbenzene, trivinylbenzene, ethylene glycol dimethacrylate, triethylene glycol dimethacrylate, 1,3-butanediol dimethacrylate, allyl acrylate, and allyl methacrylate.

The vinyl chloride resin (A) is a polyvinyl chloride, or a copolymer of 80% or more vinyl chloride and a monomer copolymerizable therewith such as, for example, vinylidene chloride, vinyl acetate, vinyl stearate, an acrylic ester, a methacrylic ester, styrene, acrylonitrile, ethylene, or propylene, or a derivative such as a post-chlorinated product of the homopolymer or the copolymer, or a mixture thereof.

The composition of the present invention is a mixture of the three resins (A), (B) and (C) described above in which the total of the contents of the impact strength modifier resin (B) and of the copolymer (C) is 80 to 20%, the ratio between these resins (B) and (C) being 10 to 60% to 90 to 40%, and the content of the vinyl chloride resin (A) is 20 to 80%.

The resins (A), (B) and (C) can be blended by a conventional method with the use of a Banbury mixer, mixing rolls or an extruder, and may also be blended in latex form and thereafter solidified.

If the vinyl chloride resin content exceeds 80%, a resin composition having satisfactory thermal deformation resistance and mechanical properties cannot be obtained. Below 20%, the vinyl chloride resin cannot manifest its excellent properties.

For these reasons, the impact strength modifier resin (B) and the copolymer (C) are used in a total quantity of 80 to 20% with respect to 20 to 80% of the vinyl chloride resin. If more than 90% of the copolymer (C) and less than 10% of the impact strength modifier resin (B) with respect to the total quantity of these resins are used, the impact strength of the resin composition will be poor. The use of less than 40% of the copolymer (C) and more than 60% of the impact strength modifier resin (B) is also undesirable because the thermal deformation resistance of the resin composition is lowered.

If desired, heat stabilizers, photostabilizers, polymer processing aids, colorants, fillers and other optional additives may be added to the resin composition of the present invention.

The resin composition obtained in accordance with the present invention possesses improved thermal deformation resistance coupled with high impact strength, and is suitable for injection molding and extrusion molding. Especially, this resin composition is advantageously utilized for the profile extrusion or pipe extrusion for which strict dimensional accuracy is required. In this case, existing facilities for processing vinyl chloride resins need not be modified, and thus the resin composition of the present invention has high industrial utility.

In order to indicate more fully the nature and utility of this invention, the following specific examples of practice constituting preferred embodiments of the invention and comparison examples are set forth, it being understood that these examples are presented as illustrative only and not intended to limit the scope of the invention.

EXAMPLES 1 THROUGH 5

250 parts of distilled water, 3.0 parts of potassium oleate which had been dissolved in water, 0.2 part of dioctyl sodium sulfosuccinate, formaldehyde sodium sulfoxylate dihydrate, 0.003 part of ferrous sulfate septihydrate, 0.01 part of disodium ethylenediaminetetraacetate dihydrate, cumene hydroperoxide, and a first-stage monomer mixture of the composition and in the quantity shown in Table 1 were charged into a reactor provided with an agitator, the quantities of the formaldehyde sodium sulfoxylate dihydrate and cumene hydroperoxide being 0.4 part and 0.3 part, respectively, per 100 parts of the monomer mixture in both the first- and second-stage polymerization processes, the latter of which will be mentioned hereinafter. The atmosphere within the reactor was purged with nitrogen, and the temperature in the reactor was then raised to 60° C. with stirring. The reaction mixture was caused to react at this temperature for 16 hours.

Thereafter, formaldehyde sodium sulfoxylate dihydrate, cumene hydroperoxide, and a second-stage monomer mixture of the composition and in the quantity set forth in Table 1 were added, and the resulting mixture was allowed to react at 60° C. until the conversion reached nearly 100%.

After cooling of the reaction mixture, the latex obtained was coagulated with hydrochloric acid and subsequently neutralized, filtered, washed with water, and dried, whereupon powdery copolymers (C-1) through (C-5) were obtained.

100 parts of a resin mixture comprising 28% of each of the copolymers obtained in the manner described above, 12% of BTA-IIIF$_1$ (methyl methacrylate/butadiene/styrene copolymer, produced by Kureha Kagaku Kogyo K.K., Japan) as an impact strength modifier, and 60% of polyvinyl chloride (S-901, produced by Kureha Kagaku Kogyo K.K., Japan, of an average degree of polymerization of 1000) was blended with 2.0 parts of a dioctyltinmercapto compound, 1.0 part of a polymerized organotinmercapto compound, 0.5 part of stearyl alcohol, and 0.2 part of butylene glycol montanate (partially saponified). Each resulting composition was kneaded for 3 minutes with mixing rolls having a surface temperature of 190° C., and press-formed at 200° C. into a sheet. Each resin sheet thus prepared was tested, whereupon the results set forth in Table 2, Examples 1 through 5 were obtained.

EXAMPLE 6

250 parts of distilled water, 1.0 part of sodium n-dodecylbenzenesulfonate which had been dissolved in water, 0.06 part of potassium persulfate, 0.015 part of sodium hydrogensulfite, 15 parts of α-methylstyrene, 12 parts of methyl methacrylate, 3 parts of acrylonitrile, and 0.9 part of divinylbenzene were charged into a reactor provided with a stirrer. The atmosphere within the reactor was purged with nitrogen, and the temperature therein was then raised to 60° C. with stirring. The above mixture was caused to react at this temperature for 16 hours.

Subsequently, 0.28 part of potassium persulfate and 0.035 part of sodium hydrogensulfite were added with continuous stirring at 60° C., and then a monomer mixture comprising 49 parts of α-methylstyrene, 10.5 parts of methyl methacrylate, 10.5 parts of acrylonitrile, and 0.21 part of n-dodecyl mercaptan was added continually over a period of 8 hours.

The resulting mixture was further allowed to react for 24 hours. After completion of the reaction, the latex obtained was coagulated with sodium chloride, filtered, washed with water, and dried, whereupon a powdery copolymer (C-6) was obtained.

This copolymer (C-6) was blended with polyvinyl chloride (of an average degree of polymerization of 1000) and BTA-IIIF$_1$ exactly in the same manner as in Example 1, and the composition thus obtained was tested similarly. The results are shown in Table 2, Example 6.

EXAMPLES 7 AND 8

Polymerization was carried out substantially in the manner set forth in Examples 1 through 5 except that the species, compositions and quantities of the monomers were modified as shown in Table 1 to prepare copolymers C-7 and C-8.

These copolymers C-7 and C-8 were respectively blended with polyvinyl chloride of an average degree of polymerization of 1000) and an impact strength modifier resin (BTA-IIIF$_1$) as in Example 1, and the compositions obtained were tested. The results are summarized in Table 2, Examples 7 and 8.

COMPARISON EXAMPLES 1, 2 & 3

A polymerization adjuvant solution was prepared by charging into a reactor provided with a stirrer and admixing 250 parts of distilled water, 3.0 parts of potassium oleate which had been dissolved in water, 0.2 part of dioctyl sodium sulfosuccinate, 0.4 part of formaldehyde sodium sulfoxylate dihydrate, 0.003 part of ferrous sulfate septihydrate, 0.01 part of disodium ethylenediaminetetraacetate dihydrate, and 0.3 part of cumene hydroperoxide. To this solution was added a monomer mixture in the quantities and of the compositions set forth in Table 1, R-1 and R-2 (corresponding respectively to the compositions of the first- and second-stage monomers for the copolymer C-1). The atmosphere within the reactor was purged with nitrogen, and then the temperature in the reactor was raised to 60° C. with stirring. The mixture was caused to react at this temperature for 24 hours.

After cooling of the reaction mixture, the latex obtained was coagulated with hydrochloric acid, neutralized, filtered, washed with water, and dried, whereupon powdery copolymers (R-1) and (R-2) were obtained.

28% each of the copolymers (R-1) and (R-2) (Comparison Examples 1 and 2, respectively) or 8.4% of the copolymer (R-1) and 19.6% of the copolymer (R-2) (Comparison Example 3) were added to 12% of BTA-IIIF$_1$ as an impact strength modifier and 60% of polyvinyl chloride (of an average degree of polymerization of 1000). Stabilizers and other additives were further added to each resulting mixture as in Example 1. The compositions thus obtained were tested, whereupon the results set forth in Table 2, Comparison Examples 1, 2 and 3 were obtained.

COMPARISON EXAMPLE 4

250 parts of distilled water, 1.0 part of sodium n-dodecylbenzenesulfonate which had been dissolved in water, 0.2 part of potassium persulfate, 0.05 part of sodium hydrogensulfite, 30 parts of α-methylstyrene, 10 parts of styrene, 45 parts of methyl methacrylate, 15 parts of acrylonitrile, and 0.2 part of tert-dodecyl mercaptan were charged into a reactor equipped with a stirrer. The atmosphere within the reactor was purged with nitrogen, and then the temperature in the reactor was raised to 60° C. with stirring. The mixture was allowed to react until there remained substantially no monomers.

Subsequently, the latex obtained was coagulated with sodium chloride, filtered, washed with water, and dried, whereupon a powdery copolymer (R-3) was obtained.

This copolymer (R-3) was blended with a polyvinyl chloride and BTA-IIIF$_1$ exactly in the same manner as in Example 1, and the composition obtained was tested similarly, whereupon the results shown in Table 2, Comparison Example 4 were obtained.

COMPARISON EXAMPLE 5

To a polymerization adjuvant solution prepared from the same recipe as in Comparison Example 1 was added continually over a period of 6 hours a monomer mixture comprising 62 parts of α-methylstyrene, 27 parts of methyl methacrylate, 11 parts of acrylonitrile, and 0.3 part of tert-dodecyl mercaptan. After completion of this addition, the resultant mixture was allowed to react for 24 hours.

The latex obtained was coagulated with hydrochloric acid, neutralized, filtered, washed with water, dried, and thereafter washed again with 500 ml of ethanol by immersion for 16 hours and subsequent filtration. Upon drying of the filtrate, a copolymer (R-4) was obtained.

This copolymer (R-4) was blended with the polyvinyl chloride and BTA-IIIF$_1$ in the same manner as in Example 1, and the composition obtained was tested. The results are set forth in Table 2, Comparison Example 5.

COMPARISON EXAMPLE 6

A composition was prepared solely from the polyvinyl chloride of Example 1 and BTA-IIIF$_1$, and tested under the same conditions as in Example 1. The results obtained are shown in Table 2, Comparison Example 6.

TABLE 1

| | Copolymer | C-1 | C-2 | C-3 | C-4 | C-5 | C-6 | C-7 | C-8 | R-1 | R-2 | R-3 | R-4 |
|---|---|---|---|---|---|---|---|---|---|---|---|---|---|
| Composition of the first-stage monomer charge (part) | α-methylstyrene | 11.1 | 18.5 | 25.9 | 11.1 | | 15 | | 18.5 | 37 | | | |
| | 2-isopropenylnaphthalene | | | | | | | 18.5 | | | | | |
| | styrene | | | | | 13.7 | | | | | | | |
| | methyl methacrylate | 16.5 | 27.5 | 38.5 | 16.5 | 16.3 | 12 | 27.5 | 27.5 | 55 | | | |
| | acrylonitrile | 2.4 | 4.0 | | 2.4 | | 3 | 4 | 4 | 8 | | | |
| | methacrylonitrile | | | 5.0 | | | | | | | | | |
| | divinylbenzene | 0.9 | 1.5 | 2.1 | | 0.3 | 0.9 | 1.5 | 1.5 | 3 | | | |
| | allyl acrylate | | | | 0.3 | | | | | | | | |
| Composition of the second-stage monomer charge (part) | α-methylstyrene | 27.3 | 19.5 | 11.5 | 27.3 | 27.3 | 49 | | | | 39 | 30 | 62 |
| | 2-isopropenylnaphthalene | | | | | | | 19.5 | 19.5 | | | | |
| | styrene | | | | | 7.0 | | | | | | 10 | |
| | methyl methacrylate | 36.4 | 26.0 | 15.6 | 36.4 | 29.4 | 10.5 | 26 | 26 | | 52 | 45 | 27 |
| | acrylonitrile | 6.3 | 4.5 | 3.0 | 6.3 | 6.3 | 10.5 | 4.5 | 4.5 | | 9 | 15 | 11 |
| | n-dodecyl mercaptan | 0.21 | 0.15 | 0.09 | 0.21 | 0.21 | 0.21 | 0.15 | 0.15 | | 0.3 | | |
| | tert-dodecyl mercaptan | | | | | | | | | | | 0.2 | 0.3 |
| Method of adding monomers | | added at one time in both 1st- and 2nd-stages | | | | | added continually in 2nd stage | added at one time in both 1st- and 2nd-stages | | | added at one time | | added continually |

TABLE 2

| | Present Invention | | | | | | | | Comparison Example | | | | | |
|---|---|---|---|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | 1 | 2 | 3 | 4 | 5 | 6 |
| Composition of Resin Composition (wt. %) | | | | | | | | | | | | | | |
| Polyvinyl chloride | 60 | 60 | 60 | 60 | 60 | 60 | 60 | 60 | 60 | 60 | 60 | 60 | 60 | 88 |
| BTA-IIIF$_1$ | 12 | 12 | 12 | 12 | 12 | 12 | 12 | 12 | 12 | 12 | 12 | 12 | 12 | 12 |
| Copolymer | (C-1) 28 | (C-2) 28 | (C-3) 28 | (C-4) 28 | (C-5) 28 | (C-6) 28 | (C-7) 28 | (C-8) 28 | (R-1) 28 | (R-2) 28 | (R-1) 8.4 (R-2) 19.6 | (R-3) 28 | (R-4) 28 | |
| Thermal deformation temp. (°C.) ASTM D648 (load 18.6kg/cm$^2$) | 82.5 | 81.5 | 78.5 | 80.5 | 79.6 | 83.0 | 83.0 | 83.0 | 76.0 | 81.5 | 80.8 | 79.0 | 82.5 | 72.0 |
| Izod impact strength (Kg . cm/cm) ASTM D256 (with V-notch 23° C.) | 38 | 28 | 17 | 43 | 23 | 26 | 24 | 23 | 8 | 11 | 13 | 11 | 10 | 127 |
| Processability*$^1$ | | | | | | | | | | | | | | |

TABLE 2-continued

|  | Present Invention | | | | | | | | Comparison Example | | | | | |
| --- | --- | --- | --- | --- | --- | --- | --- | --- | --- | --- | --- | --- | --- | --- |
|  | Ex. 1 | Ex. 2 | Ex. 3 | Ex. 4 | Ex. 5 | Ex. 6 | Ex. 7 | Ex. 8 | 1 | 2 | 3 | 4 | 5 | 6 |
| Melt viscosity*2 | $6.2 \times 10^4$ | $6.7 \times 10^4$ | $7.1 \times 10^4$ | $6.5 \times 10^4$ | $6.7 \times 10^4$ | $6.7 \times 10^4$ | $6.1 \times 10^4$ | $6.2 \times 10^4$ | $6.3 \times 10^4$ | $6.2 \times 10^4$ | $6.4 \times 10^4$ | $8.0 \times 10^4$ | $6.7 \times 10^4$ | $7.3 \times 10^4$ |
| Die swell | 1.27 | 1.23 | 1.19 | 1.29 | 1.25 | 1.27 | 1.18 | 1.19 | 1.15 | 1.42 | 1.31 | 1.46 | 1.41 | 1.30 |
| Transparency (%) |  |  |  |  |  |  |  |  |  |  |  |  |  |  |
| Parallel ray transmittance | 81 | 79 | 78 | 80 | 77 | (opaque) | 56 | 72 | 74 | 81 | 77 | 82 | (opaque) | 82 |
| Haze value (JIS K-6714) | 7 | 9 | 10 | 8 | 9 |  | 17 | 8.3 | 14 | 7 | 9 | 6 |  | 5 |

*[1] The melt viscosity and die swell were measured by a melt tension tester (mfd. by Toyo Sokki K.K., Japan). Conditions: temp. 210° C., Die 1.0 mm$\phi$ × 3.0 mm$L$, shear rate 78 sec$^{-1}$. The die swell was determined as the ratio between the diameters of the extruded resin strand and of the die nozzle.
*[2] (poise)

As is apparent from Table 2, Examples 1 through 8 exhibited remarkably high thermal deformation resistance, impact strength and processability, whereas Comparison Examples 2, 4 and 5 comprising no crosslinked copolymer were found to have poor processability. Comparison Examples 1 and 3 each comprising a crosslinked copolymer showed excellent thermal deformation resistance and processability, but had poorer impact strength than the Examples of the present invention. Comparison Example 6 comprising no copolymer of the present invention had poor thermal deformation resistance although other properties thereof were excellent.

EXAMPLES 9 THROUGH 12

Compositions each comprising the copolymer (C-1), BTA-IIIF$_1$ and polyvinyl chloride (of a degree of polymerization of 1000) as shown in Table 3 were tested in the same manner as in Example 1. The results obtained are summarized in Table 3, Examples 9 through 12.

EXAMPLES 13 THROUGH 16

Compositions each comprising the copolymer (C-1), polyvinyl chloride (of an average degree of polymerization of 1000) and the impact strength modifier (ABSM resin) described hereinbelow and as shown in Table 3 were tested in the same manner as in Example 1. The results are set forth in Table 3, Examples 13 through 16.

The impact strength modifier (ABSM resin) used was prepared by the following method.

The ingredients enumerated below were charged into a 500-ml autoclave, and polymerized at 50° C. for 16 hours with stirring.

|  | part(s) |
| --- | --- |
| butadiene | 100 |
| ferrous sulfate | 0.003 |
| disodium ethylenediaminetetraacetate dihydrate | 0.005 |
| formaldehyde sodium sulfoxylate | |

-continued

|  | part(s) |
| --- | --- |
| dihydrate | 0.05 |
| diisopropylbenzene hydroperoxide | 0.2 |
| sodium pyrophosphate | 0.1 |
| potassium oleate | 0.385 |
| water | 300 |

A latex of a content of solids of about 25% was obtained in a polymerization yield of nearly 100%. To 65 parts of the solids in this latex was added 0.06 part of dioctyl sodium sulfosuccinate to stabilize the latex, and then 40 ml of a 2% aqueous solution of tartaric acid and 23 ml of a 2% aqueous solution of caustic soda were dropped into the latex simultaneously through separate nozzles to increase the size of the rubber particles. Subsequently, the pH of the latex was adjusted to 9.5 with a 2% aqueous solution of caustic soda, and 3.87 ml of a 15.5% aqueous solution of potassium oleate was added thereto.

The resulting latex and the following ingredients were charged into a 500-ml autoclave. The atmosphere within the autoclave was thoroughly purged with nitrogen, and the mixture was polymerized at 60° C. for 7 hours with stirring.

|  | part(s) |
| --- | --- |
| latex (as solids) | 65 |
| styrene | 15.5 |
| methyl methacrylate | 15.5 |
| acrylonitrile | 4 |
| diisopropylbenzene hydroperoxide | 0.035 |
| formaldehyde sodium sulfoxylate dihydrate | 0.0175 |

The latex obtained was coagulated with hydrochloric acid, washed with water, dehydrated, and dried in a Geer oven maintained at 60° C., whereupon a powdery ABSM resin was obtained. The polymerization yield was nearly 100%.

TABLE 3

|  |  | Ex. 9 | Ex. 10 | Ex. 11 | Ex. 12 | Ex. 13 | Ex. 14 | Ex. 15 | Ex. 16 |
| --- | --- | --- | --- | --- | --- | --- | --- | --- | --- |
| Composition of resin composition | Polyvinyl chloride (wt. %) | 40 | 50 | 60 | 70 | 50 | 50 | 50 | 50 |
|  | BTA-IIIF$_1$ (wt. %) | 18 | 15 | 12 | 9 |  |  |  |  |
|  | ABSM resin (wt. %) |  |  |  |  | 10 | 15 | 20 | 25 |
|  | Copolymer C-1 (wt. %) | 42 | 35 | 28 | 21 | 40 | 35 | 30 | 25 |
| Thermal deformation temp. (°C.) ASTM-D-648 (load 18.6 Kg/cm$^2$) |  | 84.5 | 83.0 | 82.5 | 77.6 | 83.0 | 81.3 | 79.9 | 78.1 |
| Izod impact strength (kg · cm/cm) ASTM-D-256 (with V-notch 23° C.) |  | 47 | 42 | 38 | 14 | 19 | 48 | 54 | 61 |
| Processability* Melt viscosity (poise) |  | $6.7 \times 10^4$ | $6.6 \times 10^4$ | $6.2 \times 10^4$ | $6.5 \times 10^4$ | $7.0 \times 10^4$ | $7.0 \times 10^4$ | $6.6 \times 10^4$ | $6.9 \times 10^4$ |

TABLE 3-continued

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| Die swell | 1.18 | 1.21 | 1.27 | 1.33 | 1.27 | 1.25 | 1.21 | 1.16 |
| Transparency (%) | | | | | | | | |
| Parallel ray transmittance | 81 | 81 | 81 | 79 | (opaque) | (opaque) | (opaque) | (opaque) |
| Haze value (JIS K-6714) | 9 | 6 | 7 | 9 | | | | |

*Measured in the manner noted in Table 2.

EXAMPLE 17

A composition formulated substantially as in Example 1 except that HIA-28 (copolymer predominantly comprising butyl acrylate, methyl methacrylate and styrene, produced by Kureha Kagaku Kogyo K.K., Japan) was used as an impact strength modifier, and comprising 60% of polyvinyl chloride (of an average degree of polymerization of 1000), 28% of the copolymer (C-1) and 12% of HIA-28 was tested. The results obtained were as follows.

| | |
|---|---|
| Thermal deformation temperature (°C.): | 79.7° C. |
| Izod impact strength (Kg . cm/cm): | 14 |
| Melt viscosity (poise)*: | $6.1 \times 10^4$ |
| Die swell*: | 1.25 |
| Transparency: | opaque |

*as measured by the method noted in Table 2.

We claim:

1. A vinyl chloride resin composition with improved thermal deformation resistance, impact strength, and processability which comprises:

(A) a vinyl chloride resin;
(B) an impact strength modifier resin; and
(C) a copolymer, and in which the vinyl chloride resin (A) constitutes 20 to 80% of the composition, the total of the impact strength modifier resin (B) and the copolymer (C) constitutes 80 to 20% of the composition, and the copolymer (C) constitutes 90 to 20% of the total of the impact strength modifier resin (B) and the copolymer (C), said copolymer (C) having been obtained by polymerizing 90 to 30 parts of a monomer mixture comprising 20 to 80% of a monomer selected from the group consisting of α-methylstyrene and 2-isopropenylnaphthalene, 1 to 70% of methyl methacrylate, 5 to 30% of acrylonitrile, and 0 to 30% of a monomer copolymerizable with the preceding monomers in the presence of a crosslinked polymer obtained by copolymerizing 10 to 70 parts of a monofunctional monomer selected from the group consisting of methyl methacrylate, acrylonitrile, methacrylonitrile, styrene, α-methylstyrene, 2-isopropenylnaphthalene, and mixtures thereof with 0.01 to 7 parts of a polyfunctional monomer having a plurality of non-conjugated ethylenic unsaturations, the sum of the quantities of said monofunctional monomer and said monomer mixture being 100 parts, all quantities expressed in percent and parts being by weight.

2. A vinyl chloride resin composition as claimed in claim 1, wherein the impact strength modifier resin (B) is selected from the group consisting of (I) copolymers of (a) an elasticity-imparting monomer selected from the group consisting of diolefins and alkyl acrylates and (b) a rigidity-imparting monomer selected from the group consisting of alkyl methacrylates, styrene, α-methylstyrene, acrylonitrile, and methacrylonitrile, and (II) substituted polyethylenes selected from the group consisting of chlorinated polyethylenes and chlorosulfonated polyethylenes.

3. A vinyl chloride resin composition as claimed in claim 1, wherein the polyfunctional monomer is selected from the group consisting of divinylbenzene, trivinylbenzene, ethylene glycol dimethacrylate, triethylene glycol dimethacrylate, 1,3-butanediol dimethacrylate, allyl acrylate, and allyl methacrylate.

4. A vinyl chloride resin composition as claimed in claim 1, wherein the monofunctional monomer comprises α-methylstyrene.

5. A vinyl chloride resin composition as claimed in claim 1, wherein the monofunctional monomer comprises 2-isopropenylnaphthalene.

6. A vinyl chloride resin composition as claimed in claim 1, wherein the monomer is copolymer (c) which is copolymerizable with α-methylstyrene or 2-isopropenylnaphthalene, methyl methacrylate and acrylonitrile is selected from the group consisting of styrene, vinyl toluene, methacrylonitrile, vinyl acetate, methacrylic acid, acrylic acid, maleic acid, fumaric acid, and itaconic acid, and esters of the acids.

7. A vinyl chloride resin composition as claimed in claim 1, wherein the vinyl chloride resin (A) is selected from the group consisting of (I) polyvinyl chloride, (II) copolymers of 80% or more vinyl chloride and a monomer copolymerizable therewith selected from vinylidene chloride, vinyl acetate, vinyl stearate, acrylic esters, methacrylic esters, styrene, acrylonitrile, ethylene, and propylene, (III) a post-chlorinated product of the homopolymer or copolymer and (IV) mixtures thereof.

* * * * *